(12) United States Patent
Corbett, Jr.

(10) Patent No.: US 6,947,443 B1
(45) Date of Patent: *Sep. 20, 2005

(54) PIPE BELLING APPARATUS AND METHOD

(75) Inventor: Bradford G. Corbett, Jr., F. W., TX (US)

(73) Assignee: S&B Technical Products, Inc., Forth Worth, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/676,967

(22) Filed: Oct. 2, 2000

(51) Int. Cl.$^7$ .............................................. B23P 11/02
(52) U.S. Cl. ...................................... 370/451; 156/189
(58) Field of Search ........................... 156/189, 192, 156/244.13, 187, 185; 277/204; 29/450, 451

(56) References Cited

U.S. PATENT DOCUMENTS

| | | | |
|---|---|---|---|
| 4,030,872 A | | 6/1977 | Parmann ..................... 425/393 |
| 4,265,951 A | * | 5/1981 | Yates et al. |
| 4,329,193 A | * | 5/1982 | Sznopek et al. |
| 4,336,014 A | * | 6/1982 | Parmann |
| 4,701,231 A | * | 10/1987 | Peters et al. |
| 5,308,090 A | * | 5/1994 | Hamada et al. |
| 5,411,619 A | | 5/1995 | Sundqvist et al. .......... 156/187 |
| 5,758,906 A | * | 6/1998 | Carlstrom |
| 5,988,695 A | * | 11/1999 | Corbett, Jr. |

* cited by examiner

*Primary Examiner*—Chau Nguyen
*Assistant Examiner*—Steve Blount
(74) *Attorney, Agent, or Firm*—Charles D. Gunter, Jr.

(57) ABSTRACT

An improved pipe belling apparatus and method are shown in which a spiral strip of thermoplastic material is extruded and wrapped spirally about a mandrel and integral gasket. The heated material is allowed to cool and the connection thus formed is stripped from the mandrel. The gasket is retained within a groove which is simultaneously formed of the thermoplastic extrusion.

7 Claims, 4 Drawing Sheets

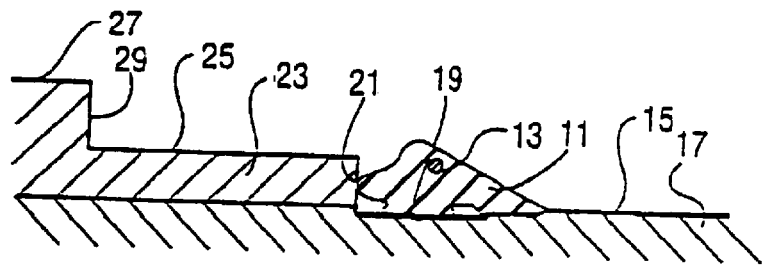
(PRIOR ART) FIG. 7
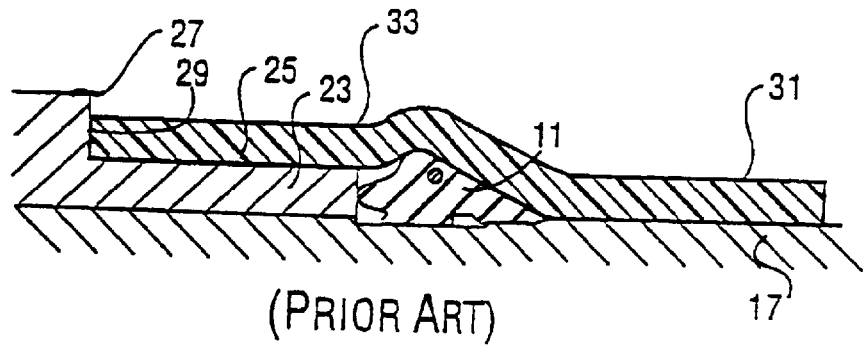
(PRIOR ART) FIG. 8
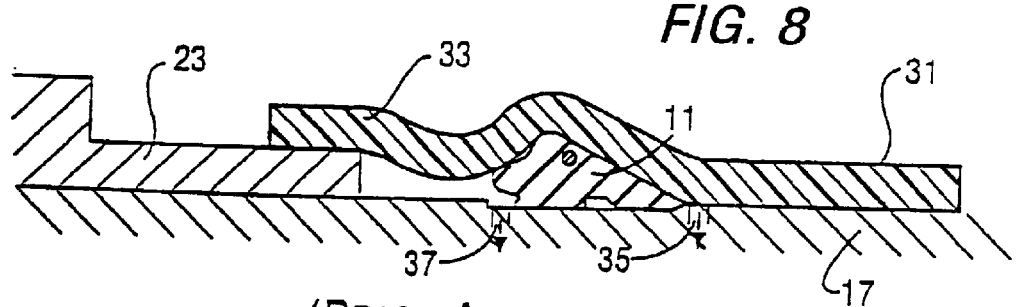
(PRIOR ART) FIG. 9
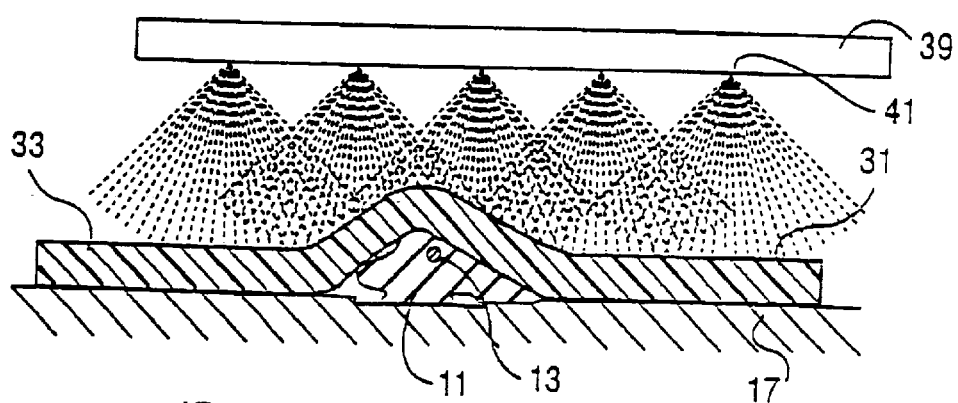
(PRIOR ART) FIG. 10

PIPE BELLING APPARATUS AND METHOD

BACKGROUND OF THE INVENTION

1. Field of the Invention

The present invention relates generally to sealing systems for thermoplastic pipes and, specifically, to an improved belling apparatus and process for installing a gasket in a socket end of a thermoplastic pipe.

2. Description of the Prior Art

Pipes formed from thermoplastic materials including polyethylene and PVC are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

A variety of other shortcomings have existed in such pipe joints of the prior art. For example, unintentional earth loading, such as traffic load, can be transferred to the socket end of the pipe sections, leading to deformations and associated leakage in the joints. Certain heat strains in the pipes, such as can occur on storage in hot weather or by close proximity to heat sources can result in deformations, shrinkage of the pipe material and resulting leakage.

One early attempt to ensure the integrity of such pipe joints was to provide local reinforcement of the groove portion of the socket end by means of a heavier wall thickness in this region of the pipe. In some cases, reinforcing sleeves or external connecting mechanisms were also utilized. Each of these solutions was less than ideal, in some cases failing to provide the needed joint integrity and often contributing to the complexity and expense of the manufacturing or field assembly operations.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint. These features increased the reliability of the joint and decreased the risk of leaks or possible failure due to abrasion or other factors. The Rieber process is described in the following issued U.S. Pat. Nos. 4,120,521; 4,061,459; 4,030,872; 3,965,715; 3,929,958; 3,887,992; 3,884,612; and 3,776,682.

Certain of the polyolefin materials were not well adapted for use in the Rieber-type process. Polyethylene, for example, after being heated has a tendency to return to its original shape. Thus, after a bell connection is formed using the traditional Rieber techniques of heating, forming and cooling, the end result is a shape that is not stable.

Accordingly, an object of the present invention is to provide a method of installing a gasket in a socket end of a thermoplastic pipe, including a polyethylene pipe, in a Rieber-type process which provides a stable shape upon cooling.

Another object is to provide such a manufacturing technique which is simple to implement and which provides reliable results.

Another object of the invention is to provide an integral gasket within the socket end of a polyethylene pipe which is securely retained within a receiving groove which is integrally formed about the gasket during the manufacturing step.

Another object of the invention is to allow the manufacturing of very large diameter gasketed pipe at a lower cost that traditional methods.

SUMMARY OF THE INVENTION

A method is shown for installing a gasket in a socket end of a thermoplastic pipe which is used to form a pipe coupling. A mandrel is provided with an inner extent and an outer extent and having a generally cylindrical outer working surface. A gasket is installed at a first circumferential position on the outer working surface. An extruded strip of thermoplastic material is spirally wrapped about the working surface of the mandrel and over the gasket, whereby the thermoplastic material is conformed to the shape of the gasket. A leading portion of the gasket again contacts the working surface of the mandrel to form a bell connection. The bell connection with the integrally contained gasket can then be retracted from the working surface of the mandrel. The thus formed bell connection can be electrowelded onto a generally cylindrical length of thermoplastic pipe to form a pipe joint.

In a preferred embodiment of the invention, a rotatably driven mandrel is provided having a substantially cylindrical end section corresponding to the internal diameter of a bell connection to be formed. The mandrel has an outer extent and an inner extent and also has a locating area for an elastomeric gasket on an external working surface thereof. The elastomeric gasket is positioned on the external surface of the mandrel at the locating area thereof, the locating area being between the inner and outer extents of the mandrel. A bell connection is then formed about the mandrel and suitably located gasket by extruding a melt profile made of thermoplastic material onto the mandrel beginning adjacent the inner extent of the mandrel and spirally winding the melt profile around the cylindrical end section of the mandrel and around the gasket such that adjacent windings of the melt profile make contact and are fused. The bell connection thus formed is then cooled and the bell connection and gasket are stripped from the mandrel.

Additional objects, features and advantages will be apparent in the written description which follows.

BRIEF DESCRIPTION OF THE DRAWINGS

FIGS. 7–10 are simplified, schematic views of the prior art Rieber process for installing a gasket in a socket end of a thermoplastic pipe.

DETAILED DESCRIPTION OF THE INVENTION

Figure 1:
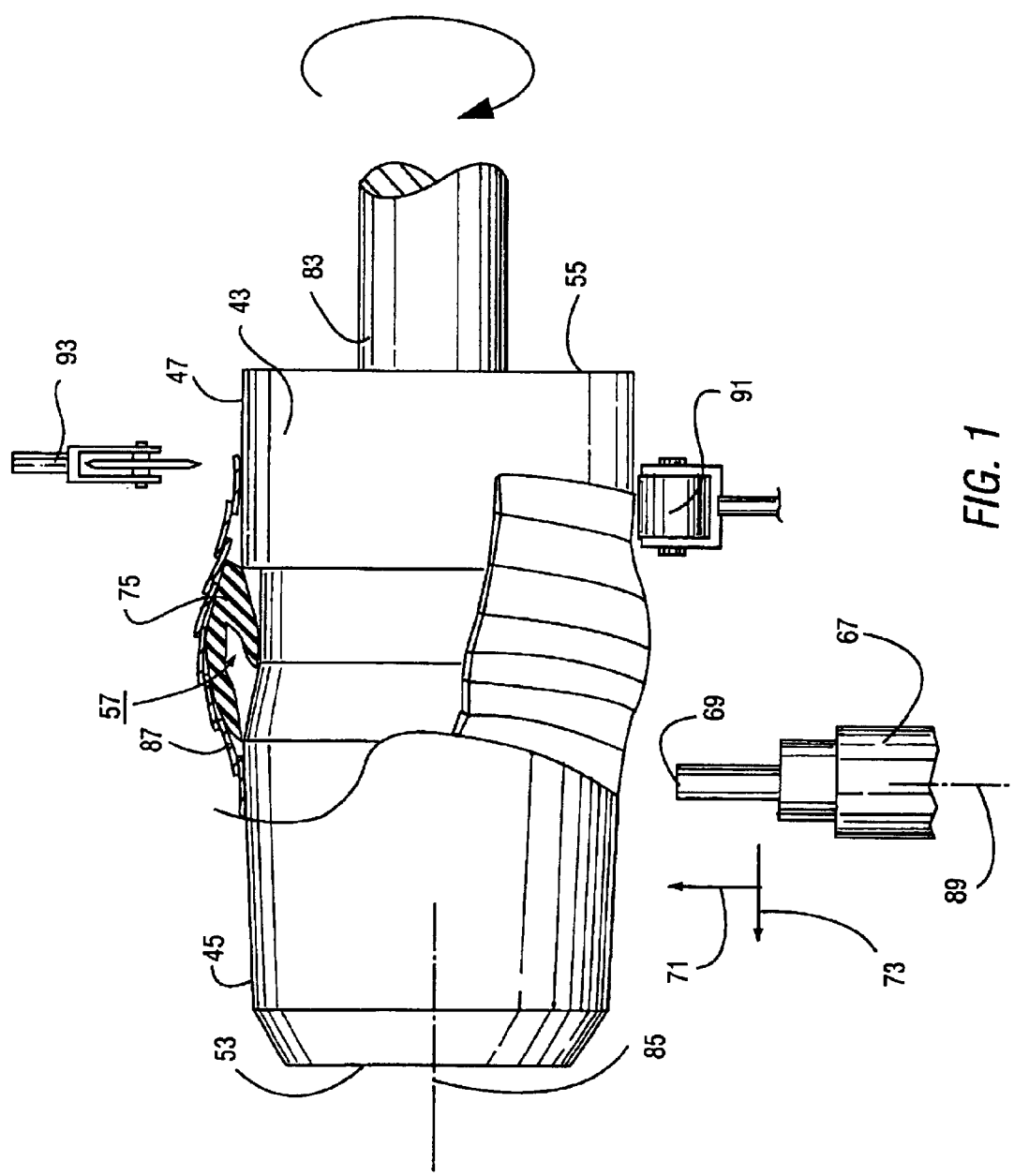
FIG. 1 is a simplified, partially schematic view of the apparatus and method of the invention showing the mandrel upon which the thermoplastic material is being extruded and wrapped.

The advantages of the method of the invention can best be understood with reference to a simplified discussion of the prior art Rieber process. Turning first to FIGS. 7–10, the prior art process is illustrated. FIG. 7 shows a section of a conventional elastomeric sealing gasket 11 having a steel reinforcing ring 13 in place on the generally cylindrical outer working surface 15 of the mandrel 17 used in the belling process. The elastomeric gasket 11 can be formed of, for example, rubber and is a ring shaped, circumferential member having an inner compression surface 19 and an exposed nose portion 21 which, as shown in FIG. 1, abuts a forming collar 23. The forming collar 23 has a first generally cylindrical extent 25 which is joined to a second cylindrical extent 27 by a step region 29, whereby the second extent 27 is of greater external diameter than the first cylindrical extent 25, shown in FIG. 7.

In the first step of the prior art process, the steel reinforced elastomeric ring 11 is thus placed onto the working surface of the mandrel 17 and pushed to a position against the back-up or forming collar 23. In this position, the gasket is firmly anchored to the mandrel surface with the rubber between the mandrel and the steel-ring of the gasket being compressed by approximately 20%.

In the second step of the prior art process, the socket end 33 of the thermoplastic pipe 31 is heated and pushed over the steel mandrel 17, gasket 11 and back-up collar 23. The socket end 33 is expanded due to the thermoplastic nature of the pipe. A number of thermoplastic materials, such as polyvinylchloride (PVC) are known in the prior art having the required expansion characteristics, depending upon the end application of the pipe joint.

The socket end 33 flows over the first cylindrical extent 25 of the back-up collar 23 and abuts the step region 29 in the second step of the process (see FIG. 8).

In the next step of the prior art process (FIG. 9) hydraulic cylinders are actuated to move the mandrel and pipe away from the back-up collar 23 and the pipe socket end 33 retracts around the mandrel and gasket 11 due to the elastic forces of the thermoplastic material. Typically, vacuum was also applied through ports 35, 37 which connected the mandrel working surface with a vacuum source (not shown).

In the final step of the prior art process (FIG. 10), the pipe socket end 33 is cooled by means of a water spray bar 39 and spray nozzles 41. As the cooling takes place, the pipe socket end 33 shrinks around the gasket 11, thus compressing the rubber body of the gasket between the steel reinforcing ring 13 and the socket-groove to establish a firm seal.

The above described Rieber process has been in commercial use since the early 1970's and is described in the above referenced issued United States patents, among other sources. It will thus be well familiar to those skilled in the thermoplastic pipe sealing arts.

Turning to FIG. 1, there is shown the improved apparatus and method for forming a bell connection for a thermoplastic pipe having an integral gasket. The apparatus includes a mandrel 43 which is a generally cylindrical member including an outer cylindrical extent 45 and an inner cylindrical extent 47. The mandrel can be formed of steel and the inner and outer extents 45, 47 together form a generally cylindrical outer working surface (51 in FIG. 2) between an inner end 53 and outer end 55 thereof (FIG. 1).

Figure 2:
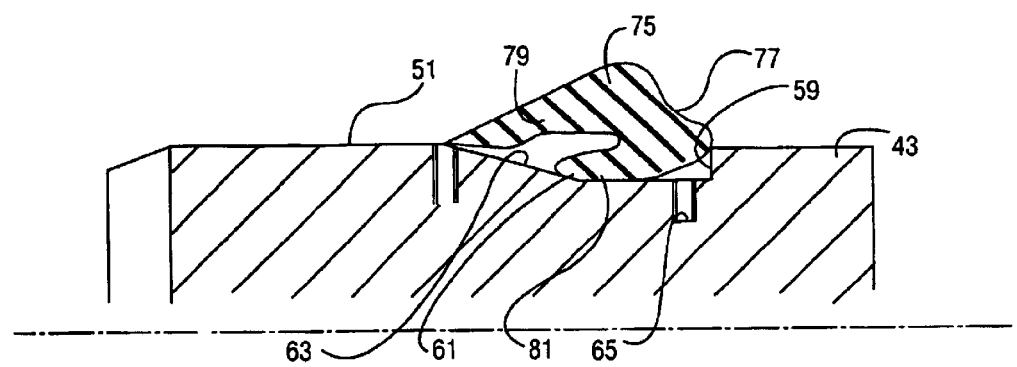
FIG. 2 is a side, partial cross-sectional view of the mandrel used in the method of the invention showing the elastomeric gasket located on the external working surface thereof.

The inner and outer cylindrical extents are joined at a stepped region 57 which forms a region of decreased external diameter on the working surface 51 of the mandrel 43. As best seen in FIG. 2, the stepped region 57 includes a vertical shoulder 59, a cylindrical trough region 61 and an outwardly sloping ramp region 63 which connects to the working surface 51. A vacuum port 65 is also provided on the mandrel and communicates a source of vacuum pressure or positive air pressure to the stepped region 57.

As shown in FIGS. 1 and 2, gasket 75 is installed at a first circumferential position which comprises the stepped region 57 of the outer working surface of the mandrel. The gasket 75 comprises an elastomeric body having a leading extent 77, a trailing extent 79 and an interior flap portion 81. The leading extent 77 contacts the vertical shoulder region 59 of the mandrel to assist in retaining the gasket in position on the mandrel during the subsequent manufacturing steps.

As shown schematically in FIG. 1, the mandrel 43 is connected to a rotary drive 83 which rotates the mandrel about a longitudinal axis 85 thereof.

The apparatus of the invention also includes an extruder head 67 having a nozzle 69 (FIG. 1). The extruder head 67 is movable along the axes indicated as 71, 73 in FIG. 1 so that the apparatus can lay down a strip of thermoplastic material with the strip being spirally wound about the working surface of the mandrel and over the gasket 75 as the mandrel turns about the axis 85 as shown in FIG. 1. In other words, the mandrel 43 is rotated about its axis 85 while a strip of thermoplastic material (87 in FIG. 3) is wrapped around the mandrel 43. The extruder head's axis 89 is perpendicular to the rotational plane of the mandrel 43. The extruder head 67 is also displaced in the direction of the mandrel axis 85 in order to lay down the spiral strip 87. As shown in FIG. 1, the apparatus can also have other conventional accessory devices such as the pressure roller 91 and cutting knife 93 to facilitate placement of the strip 87 and termination of the extrusion.

Figure 3:
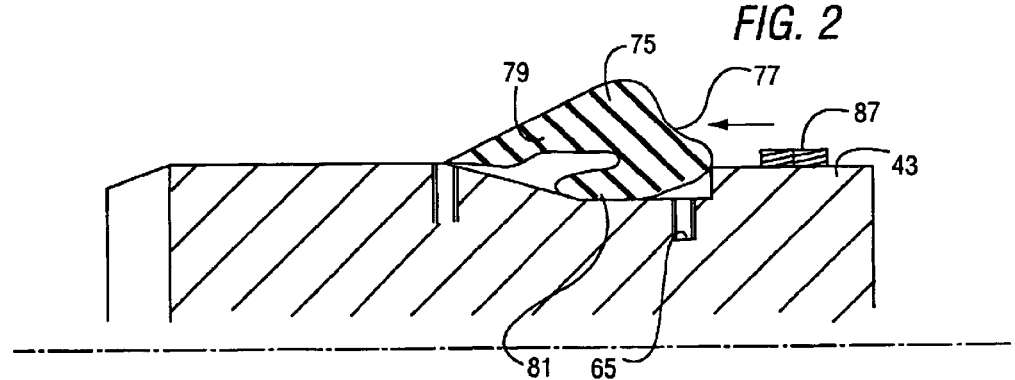
FIG. 3 is a view similar to FIG. 2, showing the beginning of the extrusion step of the method of the invention.
Figure 4:
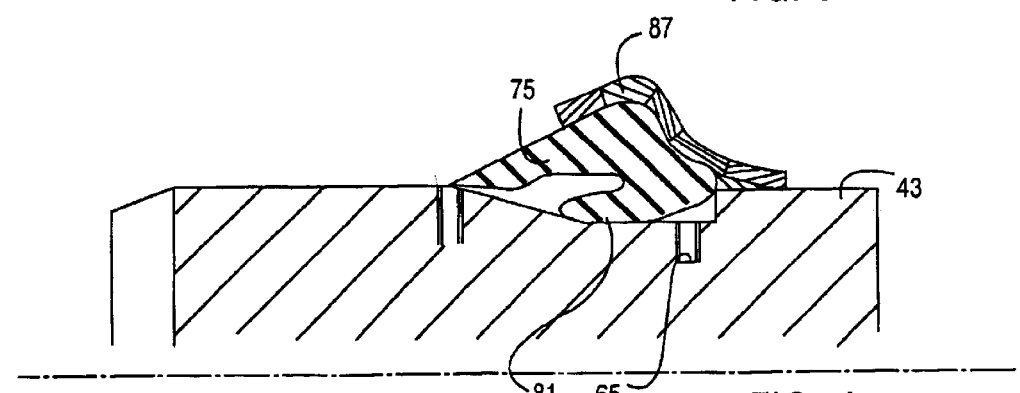
FIGS. 4 and 5 are a continuation of FIG. 3 showing the further extrusion steps of the method of the invention.
Figure 5:
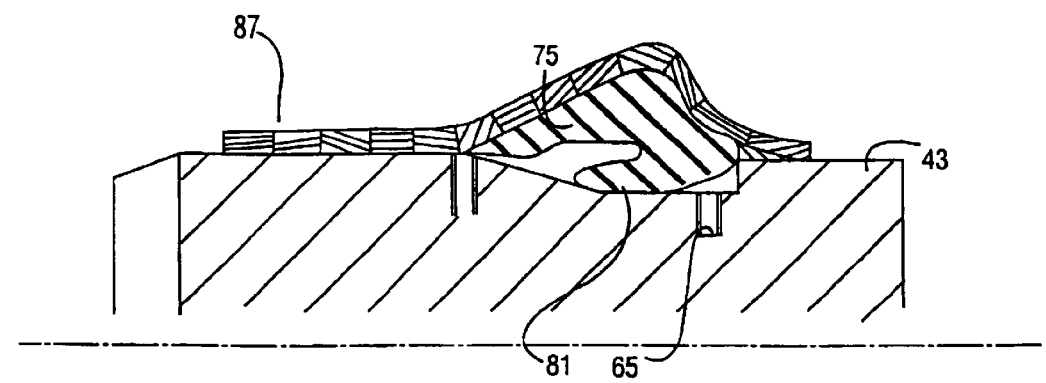

FIGS. 2–6 illustrate the method steps of the invention in schematic fashion. In FIG. 2, the gasket 75 is first mounted on the forming mandrel 43 in the stepped region 57 thereof. FIGS. 3 and 4 shown the extrusion of the thermoplastic material with the strip forming around the gasket and mandrel.

A number of thermoplastic materials may have the desired expansion characteristics for use in the method of the invention. The generally preferred materials are polyolefin type materials, such as polyethylene, polyvinylchloride, polyvinylchloride acetate, polystyrene, and the like. The most preferred material is commercially available polyethylene.

Preferably, the mandrel 43 is continuously rotated and heated. The heating can be accomplished in conventional fashion, as by use of a gas blower from inside the mandrel or outside, or in an inductive way from outside the mandrel. When the mandrel has reached the desired temperature, a melt profile of the thermoplastic material is extruded onto the working surface of the mandrel beginning at the inner cylindrical extent 47 adjacent the end 55. The extrusion is preferably carried out using an extruder nozzle 69 of substantially rectangular cross section, the nozzle being movable in an axial direction along the mandrel, as previously discussed.

Preferably, the movement of the extruder head 67 is synchronized with the movement of the mandrel such that the extruder nozzle, for each rotation of the mandrel 43, moves in a direction toward the mandrel end 53 a distance that is slightly less than the width of the melt profile being extruded such that a slight overlap is obtained. In this way, a spiral winding of the melt profile around the mandrel and gasket is obtained with the turns of the winding being located tightly above one another such that a welding-together of the melt profiles is obtained. The heated roll 91 can be used to improve the welding together of the strips and for obtaining a more uniform exterior surface of the welded body.

The extrusion continues until a desired length of bell connection is obtained, after which the extruder is stopped. When the extrusion is stopped, the thermoplastic material is typically cooled down by spraying with cooling water form the outside of the extruded bell connection. The wrapping process is now complete and the gasket 75 is completely encapsulated. The rotating knife 93 with is rotating blade may be pressed in a hydraulic or mechanical way against the spiral windings to provide cleanly cut ends on the connection. After the thermoplastic material has cooled and set, the finished "bell" can be stripped from the mandrel.

Figure 6:
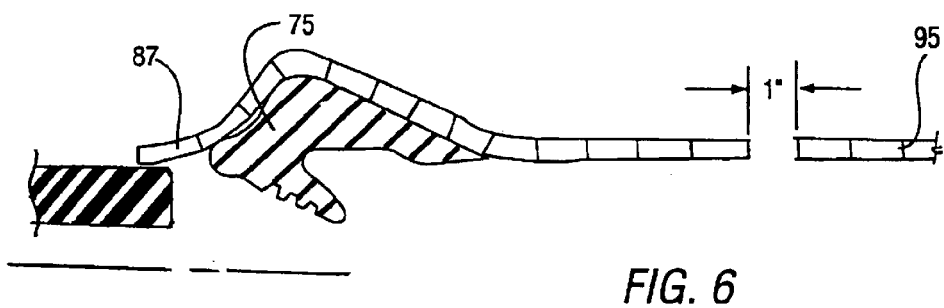
FIG. 6 is a side, partial cross section view showing the bell connection and integral gasket having been stripped from the forming mandrel and with a mating male section of pipe being installed within an end opening of the bell connection.

The stripping step can be accomplished in any convenient manner, as by blowing pressurized air between the mandrel and melt profile through port 65 at the same time that a pushing force is directed against the melt profile along the axis 85 of the mandrel. As shown in FIG. 6, the formed bell can be electrowelded or otherwise joined to a straight piece of pipe so that a final gasketed joint of pipe is obtained An invention has been provided with several advantages. The improved apparatus and method provide a bell connection formed from polyethylene which is not subject to many of the deficiencies of the prior art due to the physical properties of polyethylene and its tendency to revert to its original shape after being heated, formed and cooled. The bell pipe connection of the invention is stable and maintains its desired shape characteristics. The mechanism for forming the bell connection is relatively simple in design and operation, thereby providing a cost effective manufacturing process. The integral gasket design of the connection provides improved reliability over designs which require insertion of a gasket after manufacture of the pipe joint or in the field.

While the invention has been shown in only one of its forms, it is not thus limited but is susceptible to various changes and modifications without departing from the spirit thereof.

What is claimed is:

1. A method of forming a polyethylene pipe coupling including a bell end connection for a section of polyethylene pipe, the method comprising the steps of:

providing a rotatably driven mandrel having a substantially cylindrical end section corresponding to the internal diameter of a bell end connection to be formed, the mandrel having an outer cylindrical extent and an inner cylindrical extent, the mandrel having a locating area for an elastomeric gasket on an external surface thereof, the locating area forming a region of decreased external diameter on the otherwise substantially cylindrical end section of the mandrel;

positioning an elastomeric gasket on the external surface of the mandrel within the region of decreased external diameter at the locating area thereof, the locating area being between the inner and outer cylindrical extents of the mandrel;

forming a bell connection about the mandrel and suitably located gasket by extruding a heated melt profile made of polyethylene onto the mandrel beginning adjacent the inner extent of the mandrel and spirally winding the melt profile around the cylindrical end section of the mandrel and around the gasket such that adjacent windings of the melt profile make contact, passage of the spirally wound melt profile around the mandrel cylindrical inner extent, the region of decreased external diameter containing the elastomeric gasket, and the mandrel cylindrical outer extent serving to locate the elastomeric gasket within a gasket receiving groove of a desired shape;

cooling the bell connection thus formed to thereby maintain the desired shape of the gasket receiving groove and secure the elastomeric gasket within the gasket receiving groove so formed;

removing the bell connection and gasket from the mandrel; whereby a pre-stressed and pre-located integral gasket is provided within the bell connection which is securely retained within the gasket receiving groove, the bell connection being integrally formed about the gasket during manufacture; and installing a mating male section of polyethylene pipe within an end opening of the bell connection, the mating section of polyethylene pipe having an exterior surface, the pre-stressed and pre-located integral gasket forming a sealing surface with respect to the matins male pipe section in making up the polyethylene pipe coupling.

2. A method of forming a polyethylene pipe coupling including a bell end connection for a section of polyethylene pipe, the method comprising the steps of:

providing a rotatably driven mandrel having a substantially cylindrical end section corresponding to the internal diameter of a bell end connection to be formed, the mandrel having an outer cylindrical extent and an inner cylindrical extent, the mandrel having a locating area for an elastomeric gasket on an external surface thereof, the locating area forming a region of decreased external diameter on the otherwise substantially cylindrical end section of the mandrel;

positioning an elastomeric gasket on the external surface of the mandrel within the region of decreased external diameter at the locating area thereof, the locating area being between the inner and outer cylindrical extents of the mandrel;

forming a bell connection about the mandrel and suitably located gasket by extruding a heated melt profile made of polyethylene onto the mandrel beginning adjacent the inner extent of the mandrel and spirally winding the melt profile around the cylindrical end section of the mandrel and around the gasket such that adjacent windings of the melt profile make contact, passage of the spirally wound melt profile around the mandrel cylindrical inner extent, the region of decreased external diameter containing the elastomeric gasket, and the mandrel cylindrical outer extent serving to locate the elastomeric gasket within a gasket receiving groove of a desired shape;

terminating the extruding step while continuing to rotate the mandrel;

spraying cooling water over the bell end connection thus formed to thereby maintain the desired shape of the gasket receiving groove and secure the elastomeric gasket within the gasket receiving groove so formed;

cutting a free end of the connection with a rotating knife;

removing the bell end connection and integral gasket from the mandrel;

whereby a pre-stressed and pre-located integral gasket is provided within the bell connection which is securely retained within the gasket receiving groove, the bell connection being integrally formed about the gasket during manufacture; and installing a mating male section of polyethylene pipe within an end opening of the bell connection, the mating section of polyethylene pipe having an exterior surface, the pre-stressed and pre-located integral gasket forming a sealing surface with respect to the mating male pipe section in making up the polyethylene pine coupling.

3. The method of claim 2, wherein the mandrel is heated to at least about 100 degrees C. before the melt profile is extruded.

4. The method of claim 2, further comprising the step of subjecting the extruded melt profile to a weak mechanical loading by means of a rotating roll for intensifying a welding-together of the contacting melt profile windings.

5. The method of claim 2, wherein the rotating knife comprises a freely rotating circular blade which is pressed against the polyethylene of the bell end connection for cutting the free end of the connection.

6. The method of claim 2, further comprising the steps of:

removing the bell connection from the mandrel by blowing pressurized air between the mandrel and the connection while directly pushing the connection in a direction opposite the mandrel.

7. The method of claim 6, further comprising the step of:

electrowelding the thus formed bell connection onto a generally cylindrical length of thermoplastic pipe.

* * * * *